(12) United States Patent
Langel

(10) Patent No.: US 8,777,141 B2
(45) Date of Patent: Jul. 15, 2014

(54) ROLLER MILL

(75) Inventor: Joerg Langel, Koeln-Porz (DE)

(73) Assignee: Loesche GmbH, Duesseldorf (DE)

( * ) Notice: Subject to any disclaimer, the term of this patent is extended or adjusted under 35 U.S.C. 154(b) by 0 days.

(21) Appl. No.: 13/128,084

(22) PCT Filed: Aug. 11, 2010

(86) PCT No.: PCT/EP2010/004922
§ 371 (c)(1),
(2), (4) Date: Aug. 8, 2011

(87) PCT Pub. No.: WO2011/044966
PCT Pub. Date: Apr. 21, 2011

(65) Prior Publication Data
US 2012/0318900 A1    Dec. 20, 2012

(30) Foreign Application Priority Data
Mar. 9, 2010 (DE) .......................... 10 2010 010 752

(51) Int. Cl.
*B02C 15/00* (2006.01)

(52) U.S. Cl.
USPC ........................................................ 241/121

(58) Field of Classification Search
USPC .................. 241/121, 117–119, 286
See application file for complete search history.

(56) References Cited

U.S. PATENT DOCUMENTS

| | | | |
|---|---|---|---|
| 2,214,832 A * | 9/1940 | Hobbs | 241/58 |
| 4,127,237 A * | 11/1978 | Mehta et al. | 241/58 |
| 4,339,086 A * | 7/1982 | Brundiek | 241/121 |
| 4,382,561 A * | 5/1983 | Andersen et al. | 241/121 |
| 4,432,500 A * | 2/1984 | Brundiek et al. | 241/57 |
| 4,485,974 A * | 12/1984 | Lass | 241/30 |

(Continued)

FOREIGN PATENT DOCUMENTS

| | | |
|---|---|---|
| DE | 4202784 A1 | 8/1993 |
| DE | 4442099 A1 | 5/1996 |

(Continued)

OTHER PUBLICATIONS

International Preliminary Report on Patentability and the English translation of the Written Opinion of the International Searching Authority issued on Sep. 25, 2012; International Application No. PCT/EP2010/004922.
International Search Report; PCT/EP2010/004922; Feb. 4, 2011.

*Primary Examiner* — Faye Francis
(74) *Attorney, Agent, or Firm* — Studebaker & Brackett PC

(57) ABSTRACT

A roller mill, particularly an air swept roller mill of the LOESCHE type. The roller mill is preferably provided for the comminution of cement clinker or granulated blast furnace slag and comprises on a grinding track of a rotating grinding pan stationary, rotating grinding rollers and between the grinding rollers stationary, rotatable preparation rollers which compress and remove air from the grinding bed. In order to increase the efficiency of the grinding process and at the same time to reduce the energy requirement the position of the preparation rollers is changed in such a way that the grinding material fed spirally to the grinding rollers is completely rolled over and compressed by the previously arranged preparation rollers. The preparation rollers are, seen in a top view of the grinding pan, positioned radially in the direction of the grinding pan center and roll with their running surfaces on a smaller running ring than the associated grinding rollers.

9 Claims, 4 Drawing Sheets

(56) References Cited

U.S. PATENT DOCUMENTS

| | | | |
|---|---|---|---|
| 5,244,157 A * | 9/1993 | Brundiek | 241/36 |
| 6,113,015 A * | 9/2000 | Brundiek | 241/121 |
| 7,341,212 B2 * | 3/2008 | Viljoen et al. | 241/117 |
| 7,578,459 B2 * | 8/2009 | Viljoen et al. | 241/30 |

FOREIGN PATENT DOCUMENTS

| | | | | |
|---|---|---|---|---|
| EP | 406644 A2 * | 1/1991 | | B02C 15/04 |
| JP | H07-80337 A | 3/1995 | | |
| JP | H07-116532 A | 5/1995 | | |

\* cited by examiner

ROLLER MILL

FIELD OF THE INVENTION

The invention relates to a roller mill of the LOESCHE type.

BACKGROUND OF THE INVENTION

The invention is particularly suitable for roller mills for grinding cement clinker and granulated blast furnace slag for the building material industry. The roller mills usually comprise a classifier which is generally integrated into the roller mill but can also be arranged outside of the roller mill.

EP 0 406 644 B1 discloses an air swept roller mill of the LOESCHE type, wherein the comminution of cement clinker or granulated blast furnace slag is carried out through a combination of grinding rollers and preparation rollers. The preparation rollers serve for the compression and smoothing of the grinding bed. A preparation roller is assigned to each grinding roller and forms with this a pair of rollers. Air swept roller mills with two or three such roller pairs are known which are arranged symmetrically and at the same distance from each other and roll on a rotating grinding pan or a grinding bed formed thereon. A preparation roller is thereby arranged before the respectively assigned grinding roller in order to roll over the grinding material which is fed centrally onto the rotating grinding pan and moves under the effect of the centrifugal force to a grinding track on the pan edge. This grinding material consists of a mixture of coarser particles of the freshly supplied material and smaller particles not yet comminuted to the product fineness which are rejected by the classifier arranged over the grinding chamber and fed back to the centre of the grinding pan.

FIG. 1 shows the operating principle of a known roller pair. A grinding roller 24 and a preparation roller 26 roll on a grinding bed 25 formed by the grinding material to be comminuted. Arrow A indicates the movement direction of the grinding pan or tray 23 with the grinding track 22. Arrow B is intended to illustrate the material feed and arrows C indicate the rotation direction of the grinding roller 24 and preparation roller 26 rolling on the grinding bed 25. After the supply of the material according to arrow B there is a greatly aerated grinding bed 25.1, over which the preparation roller 26 now rolls. Only a pre-compression and compaction of the material thereby takes place with the formation of a compressed grinding bed 25 from which air has been removed. Comminution does not usually take place due to the low forces under the preparation roller 26. It is only once in the grinding gap between the subsequently arranged grinding roller 24 and the horizontal grinding track 22 that the desired comminution takes place. The comminuted grinding material 25.2 then passes due to the centrifugal forces over the pan edge and is conveyed with the aid of a gas flow pneumatically to the classifier above the grinding chamber (not shown).

The grinding rollers 24 and the smaller preparation rollers 26 are conically formed and are arranged in the region of the circular grinding pan 23 with grinding track 22 in such a way that their running surfaces roll as closely as possible to the outer grinding track edge 27 or pan edge and thus have a virtually identical pitch circle radius or running ring. FIG. 2 illustrates the preparation roller 26 of this known arrangement.

In the air swept roller mill known from DE 42 02 784 C2 with two roller pairs each comprising a grinding roller and a preparation roller or pre-compression roller the speed of the preparation rollers can be regulated progressively in order to reduce the vibrations of the air swept roller mill caused by the grinding process to a minimum. Grinding rollers and preparation rollers roll with their running surfaces close to a retention rim which is arranged going around the outer edge of the grinding pan and defines the outer side of the grinding track.

DE 44 42 099 C2 and EP 0 792 191 B1 disclose a roller mill, wherein the pre-compression or preparation rollers are designed as retention rollers in order to influence the movement of grinding material between the grinding rollers and form a weir-like retaining device or a rotating retention wall. Adequate grinding material supply of the grinding rollers is thereby to be ensured at normal and also increased grinding material speed and a higher throughput with relatively low resources is thereby to be guaranteed.

The retention rollers are arranged close to each other and adjacent to the grinding rollers and roll like the grinding rollers on a running ring close to the grinding pan edge. Levelling or pre-compression of the grinding bed takes place with shell surface regions of the retention rollers which are formed between the retention areas and retention rings.

Trials and computer-assisted DEM simulations as well as evaluations of image material of experimental trials have shown that the known arrangement of the preparation rollers on the pan outer edge means that they do not completely roll over the grinding material flowing from the centre to the grinding rollers and a pre-compression does not take place in the necessary way. A part flow of the grinding material which is moved spirally from the centre of the grinding pan to the outer edge or to the grinding track moves inwards past the end face of the preparation rollers and thus arrives without pre-compression at the subsequent grinding roller. It has also been ascertained that a part flow of the grinding material already pre-compressed by a preparation roller is thrown over the pan edge under the effect of the centrifugal force before the subsequent grinding roller and is thus no longer comminuted by the subsequent grinding roller. This flow of grinding material which leaves the grinding pan respectively between a preparation and grinding roller increases the inner material circulation in the grinding and classifying chamber and necessitates additional energy for the pneumatic transport to the classifier. As this part flow has not yet been ground to product fineness it is rejected in the classifier and falls via a middlings cone back into the pan centre and reaches the grinding track. From an energy viewpoint this means that not only additional energy must be expended for the pneumatic transport but also the energy from the grinding pan drive for the pre-compression is lost.

SUMMARY OF THE INVENTION

It is the object of the invention to create a roller mill with an optimised particle movement on the grinding pan and supply of the grinding material to the grinding rollers and to increase the efficiency of the comminution as well as reducing the energy requirement, in particular having regard to the pneumatic transport of the particles in the grinding and classifying chamber.

According to the invention the object is achieved through the features of claim 1. Useful and advantageous embodiments are features of the sub-claims and described in the description of the figures.

A core idea of the invention can be seen in achieving, with the aid of a position change of the preparation rollers, a compression and compacting of all the grinding material which is fed to a subsequent grinding roller.

According to the invention the preparation rollers are positioned between the grinding rollers in such a way that the grinding material supplied spirally to the grinding rollers is completely rolled over and compressed.

It is advantageous that a virtually gap-free compression is achieved through the preparation rollers if these are adjusted radially in the direction of the grinding pan centre and thus roll with their running surfaces on a smaller running ring than the grinding rollers. The grinding rollers are furthermore positioned on the circular grinding pan in such a way that their running surfaces roll close to the edge and thus close to the grinding pan edge or to a retention rim of the grinding pan respectively. The running ring defined by the grinding rollers is thus larger than the running ring defined by the inventively positioned preparation rollers.

The radially inwardly positioned preparation rollers now facilitate a pre-compression of the whole spiral-form particle flow so that only pre-compressed grinding material is fed to a subsequent grinding roller. At the same time the radially inwardly positioned preparation rollers prevent grinding material that has not yet been adequately comminuted from going over the grinding pan edge or retention rim respectively and being trans-ported by a gas flow pneumatically for classification although the required fineness has not yet been reached.

The preparation rollers are usefully positioned at a defined distance S from the outer grinding track edge or from the outer edge of the grinding pan or a retention rim, whereby the distance S from the outer grinding track edge or grinding pan edge or retention rim extends as far as an outer side delimitation of the running surface of the preparation rollers. In general the running surface of the preparation rollers is, like the running surface of the grinding rollers, identical to the roller shell thereof.

The distance S of the preparation rollers from the outer edge of the grinding track is dependent upon the friction conditions on the grinding pan and can be varied through different influencing factors such as for example rotational speed change or wetting of the grinding material on the grinding track with liquid, but also through the number, size and distance of the grinding rollers from each other and from the preparation rollers.

It has been found that in dependence upon the properties of the grinding material to be comminuted, the selected rotational speed of the grinding pan and the requirements upon product fineness a distance S is advantageous which lies in the range of from 25% to 65% of the running surface width B of the next respective grinding roller. The running surface width B is the distance between an outer side and inner side delimitation of the running surface or the roller shell of the grinding rollers.

It is advantageous that the distance S of the preparation rollers can be adjusted through a change in the form of the roller shell of the preparation rollers. The roller shell is generally arranged on a roller base body or roller shell core and releasably fixed for example by means of a clamping ring. The running surface of the roller shell can be displaced in the direction of the grinding plate centre through a change in the roller shell form.

The preparation rollers are generally mounted on a rocker arm and can be pivoted about a rocker arm pivot shaft. If the rocker arm pivot shaft is fixed by means of pillow block bearings to the mill housing or mill upper part a horizontal displacement of the rocker arm—preparation roller system and thus a change in the radial positioning of the preparation rollers in the region of the pillow block bearing or pillow block bearing housing can take place. For example spacer plates which have been mounted between the mill housing and the pillow block bearing housing for a pre-definable position of the preparation rollers can be dismantled for a defined distance S so that the preparation rollers are radially inwardly adjustable.

The radial adjustment of the preparation rollers can furthermore take place in the region of the rocker arm pivot shaft in that the bearing housings on both sides of the rocker arm pivot shaft are displaced horizontally.

The essential advantages of the inventive roller mill consist in energy saving with simultaneous increase in the throughput. Trials on a laboratory mill with an outer grinding track diameter of 36 cm with different distances S of the preparation rollers and different grinding materials resulted in energy savings of 4 to 11%. The throughput could be increased by up to 8%. These values were confirmed through trials on an air swept roller mill of the LOESCHE type which had an outer grinding track diameter of 5.6 m. The energy reduction is based upon savings on the grinding pan drive, on the classifier rotor drive and a lower energy requirement for the pneumatic fine grain transport within the grinding system.

BRIEF DESCRIPTION OF THE DRAWINGS

The invention is described further below by reference to the drawings. These show in a highly schematised representation.

DETAILED DESCRIPTION OF THE PREFERRED EMBODIMENTS

Figure 1:
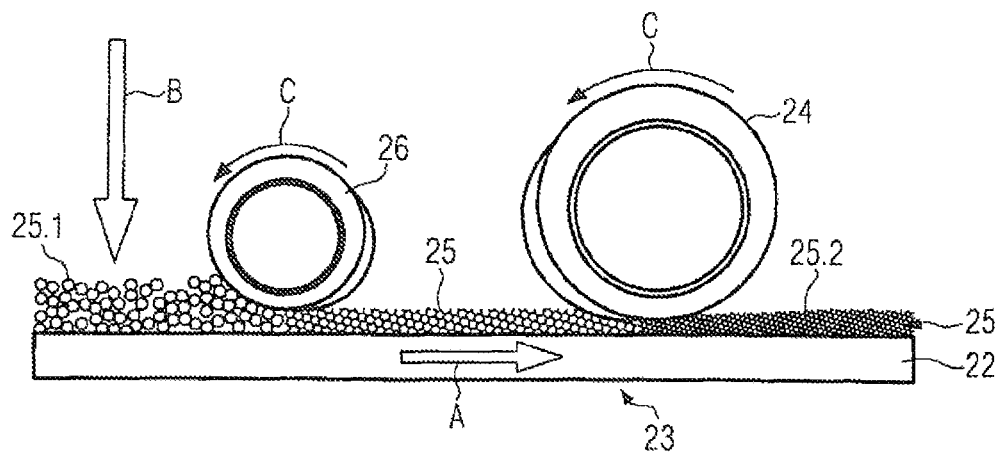
FIGS. 1 and 2 illustrate the operating principle of a known roller pair.
Figure 2:
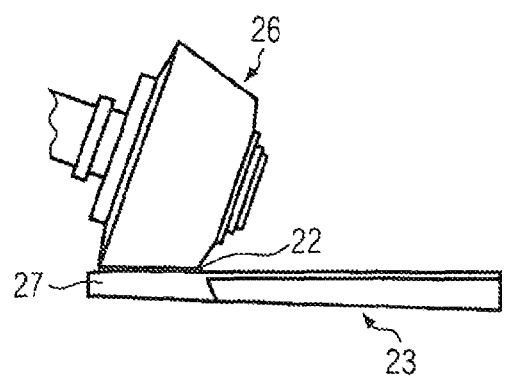

FIGS. 1 and 2 show the prior art. FIG. 1 shows the operating principle of a roller pair, consisting of a grinding roller 24 and a preparation roller 26, which has already been described.

FIG. 2 shows in a view the known arrangement of a preparation roller 26 on the outer grinding track edge 27 and thus on a virtually identical running ring to that of the subsequently arranged grinding roller (not shown).

Figure 3:
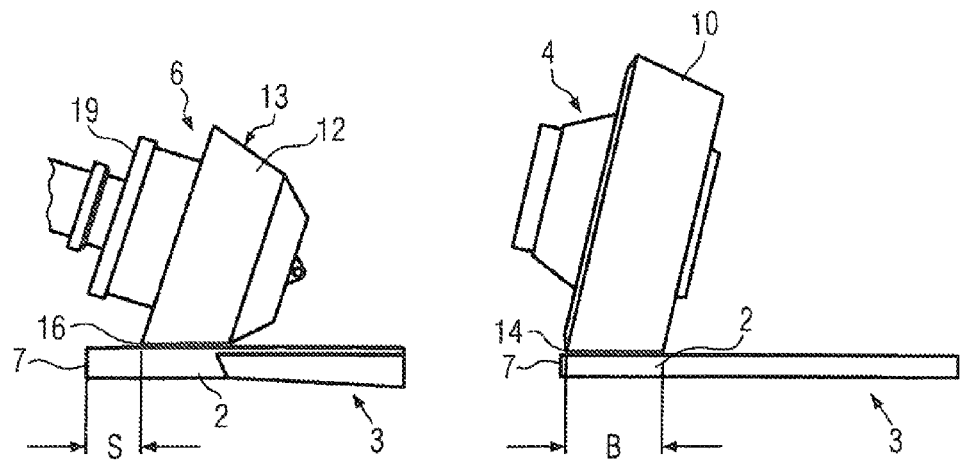
FIG. 3 an inventively positioned preparation roller in comparison with an assigned grinding roller.

FIG. 3 shows an inventive preparation roller 6 which is positioned in such a way that it completely rolls over and compresses the grinding material (not shown) fed spirally to an assigned grinding roller 4.

The grinding roller 4 and the preparation roller 6 are conical rollers which roll on a planar grinding track 2 with the formation of a parallel grinding gap. FIG. 3 shows that the preparation rollers 6 are formed to be smaller than the grinding rollers 4 as they only serve for preparation and not for grinding of the supplied grinding material (not shown).

While the grinding roller 4 is arranged on the grinding pan 3 or the grinding track 2 thereof in such a way that an outer side delimitation 14 of the running surface 10 of the grinding roller 4 rolls close to the outer grinding track edge 7 the preparation roller 6 is positioned with an outer side delimitation 16 of its running surface 12 at a distance S from the outer grinding track edge 7. In the embodiment of FIG. 3 the positions of the preparation roller 6 and the assigned grinding roller 4 are shown one beside the other. The distance S for the inventive positioning of the preparation roller 6 amounts to around 50% of the width B of the running surface 10 of the grinding roller 4. FIG. 3 illustrates in association with FIG. 2 that the position of the preparation roller 6 which has changed in the direction of the grinding pan centre can be achieved through a modified form of the roller shell 13 on a roller base body or roller shell core 19.

Figure 4:
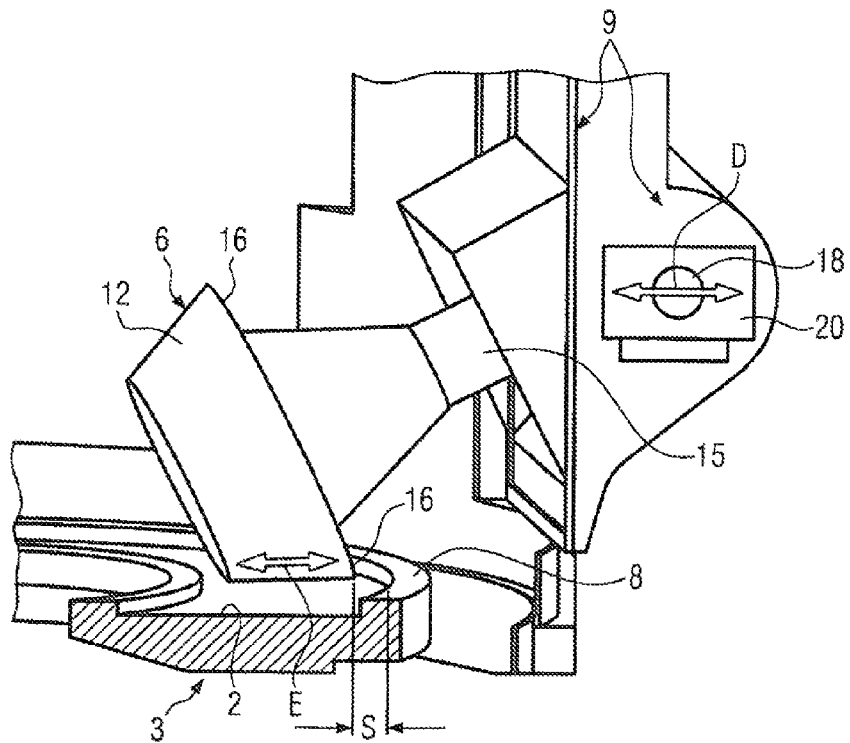
FIG. 4 a cut-out perspective representation of a grinding pan with a preparation roller.

FIG. 4 shows a grinding pan 3 with a retention rim 8 on the outer periphery and a grinding track 2 and also a preparation roller 6 which is positioned at a distance S from the retention rim 8.

Figure 5:
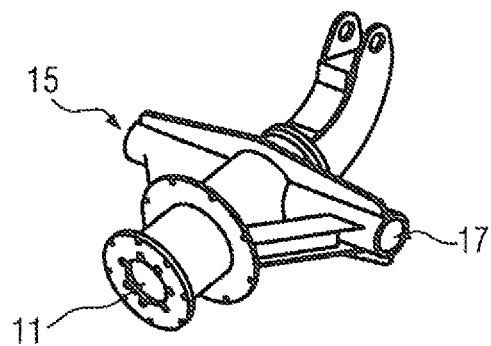
FIG. 5 a rocker arm of the preparation roller according to FIG. 4.

The preparation roller 6 is mounted on a rocker arm 15 which is mounted with its rocker arm pivot shaft 17 (see also FIG. 5) in lateral bearings with bearing housings 20 via a shaft (not shown) on the mill housing 9.

A radial change in the positioning of the preparation roller 6 can take place in dependence upon the grinding material to be comminuted, the rotational speed of the grinding pan and modified requirements upon product fineness via the lateral bearing housings 20 of the rocker arm pivot shaft 17. After the release of a clamp on the mill housing 9 the lateral bearing housings 20 can be horizontally displaced (see double arrow D) so that according to the elongated hole principle with a covering plate the rocker arm 15 and the preparation roller 6 can likewise be horizontally displaced on the grinding track 2 (see double arrow E).

Figure 6:
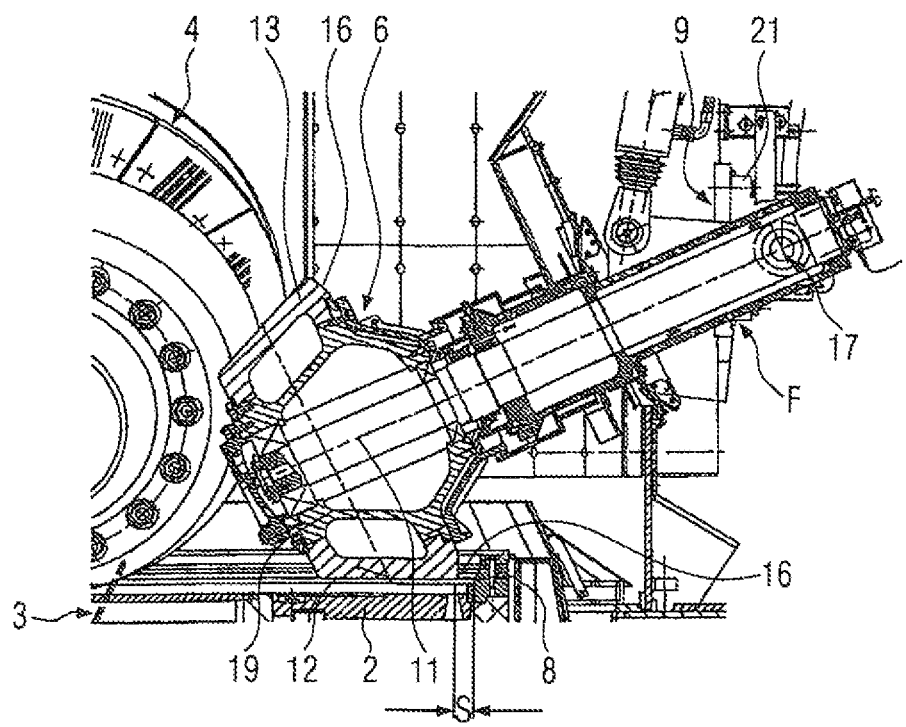
FIG. 6 a cut-out of an inventive roller mill with an alternatively mounted preparation roller.

FIG. 6 shows a cut-out of a roller mill with a grinding roller 4 and a previously arranged preparation roller 6. The preparation roller 6 is positioned at a distance S from a retention rim 8 on the outer periphery of the grinding pan 3.

The preparation roller 6 shown in section comprises a roller shell 13 which is fixed on a roller base body or roller shell core 19. The preparation roller 6 runs with its running surface 12 on a smaller running ring than the grinding roller 4.

A horizontal adjustment or displacement of the system preparation roller 6/rocker arm 15 with rocker arm pivot shaft 17 can be carried out in the region of the fixing of a pillow block or pedestal bearing housing 21 for the rocker arm 15. The rocker arm pivot shaft 17 is mounted in pillow block bearings (not shown). By removing spacer plates (not shown) which were incorporated between the pillow block bearing housing 21 and the mill housing 9 it was possible to advantageously adjust the distance S of the preparation roller 6 on site corresponding to the requirements.

Figure 7A:
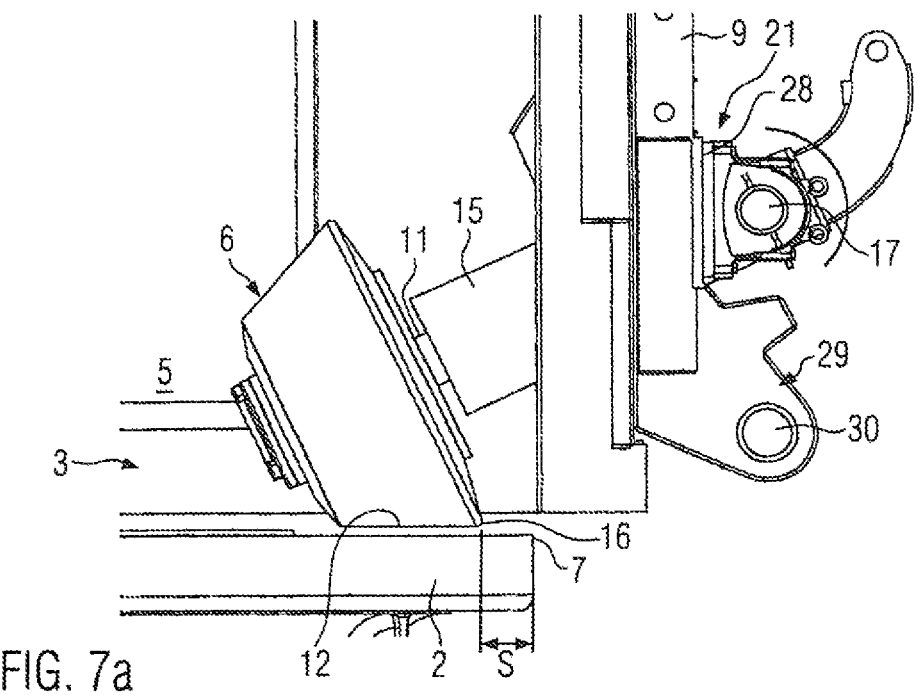
FIG. 7a, b a side view of a preparation roller with its adjustment in the region of a pillow block bearing.
Figure 7B:
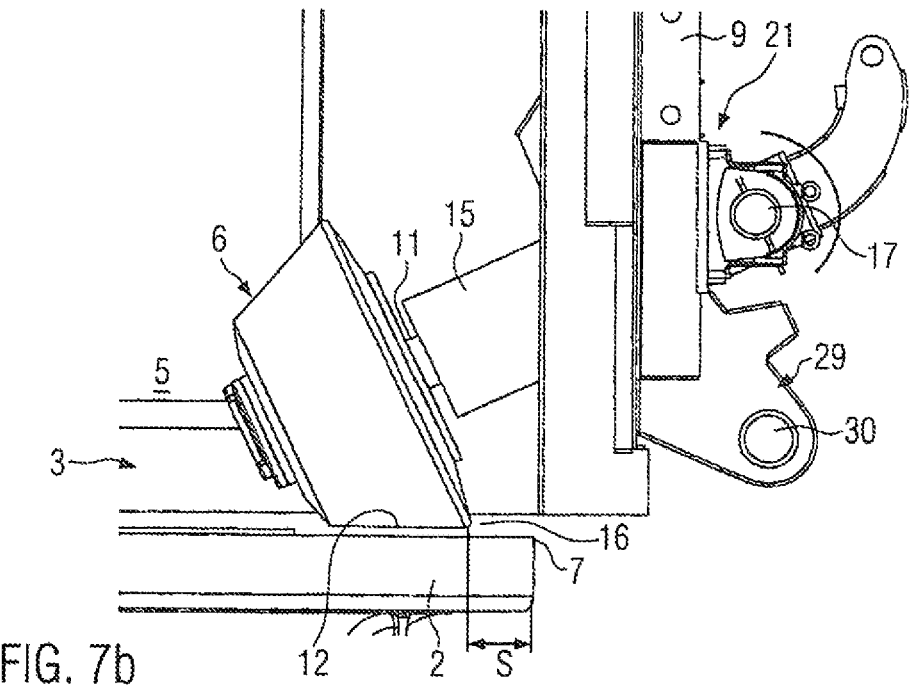

FIGS. 7a and 7b respectively show a preparation roller 6 which is fixed to a cover 29 of the mill housing 9 and can be pivoted with it about a rotation axis 30 out of the grinding chamber 5. The rocker arm shaft 17 of the rocker arm 15 of the preparation roller 6 is mounted in a pillow block bearing 21 and positioned in FIG. 7a via a spacer plate 28. This results in a distance S from the outer grinding track edge 7 of the grinding pan 3 which does not have a raised retention rim in this representation.

In FIG. 7b the spacer plate has been removed so that the preparation roller 6 is radially inwardly adjusted and the distance S between the outer grinding track edge 7 and the outer side delimitation 16 of the running surface 12 of the preparation roller 6 is larger than in the example according to FIG. 7a.

The invention claimed is:

1. Roller mill comprising
    a virtually horizontal grinding track on a rotating grinding pan, having stationary grinding rollers rotatably fixed on roller shafts, the grinding rollers roll on a grinding bed formed by grinding material to be comminuted on the grinding track, and
    stationary preparation rollers rotatably fixed on roller shafts between the grinding rollers, the preparation rollers compress and remove air from the grinding material,
    the preparation rollers being positioned in such a way that the grinding material fed spirally to the grinding rollers is completely rolled over and compressed,
    the preparation rollers being variably positioned at a distance S from an outer grinding track edge or from a retention rim of the grinding pan and the distance S extending between the outer grinding track edge or the retention rim of the grinding pan and an outer side delimitation of the running surface of the preparation rollers.

2. Roller mill according to claim 1, wherein the preparation rollers are positioned radially in the direction of the grinding pan centre and roll with their running surfaces on a smaller running ring than the grinding rollers.

3. Roller mill according to claim 1, wherein the grinding rollers are arranged in such a way that they reach with an outer side delimitation of their running surfaces virtually as far as the outer grinding track edge or the retention rim of the grinding pan.

4. Roller mill according to claim 1 wherein the positioning of the preparation rollers at the distance S under consideration of the properties of the grinding material to be comminuted is predefined by the number, size and distance of the grinding rollers, the rotational speed of the grinding pan and the required product fineness.

5. Roller mill according to claim 1 wherein the preparation rollers are positioned at the distance S which amounts to 25% to 65% of the width B of the running surfaces of the assigned grinding rollers.

6. Roller mill according to claim 5 wherein the distance S of the preparation rollers is adjusted through a change in a form of the roller shell on a roller base body or through a change of a roller shell core of the preparation rollers.

7. Roller mill according to claim 1 wherein the preparation rollers have a smaller roller diameter than the grinding rollers and are individually mounted via a rocker arm in the region of a mill housing.

8. Roller mill according to claim 7 wherein the distance positioning of the preparation rollers is adjusted through adjustment of their roller shafts in the rocker arm or in the region of the rocker arm pivot shafts or in the region of the bearings or bearing housings of the rocker arms on the mill housing.

9. Roller mill according to claim 1 wherein two, three, four, five, six or more grinding rollers are arranged and at least one preparation roller is arranged before each grinding roller, the at least one preparation roller rolls on a smaller running ring than the grinding rollers.

* * * * *